US008959659B2

(12) United States Patent
Kao

(10) Patent No.: US 8,959,659 B2
(45) Date of Patent: Feb. 17, 2015

(54) SOFTWARE AUTHORIZATION SYSTEM AND METHOD

(75) Inventor: Ming-Chih Kao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 72 days.

(21) Appl. No.: 13/009,628

(22) Filed: Jan. 19, 2011

(65) Prior Publication Data

US 2012/0117661 A1 May 10, 2012

(30) Foreign Application Priority Data

Nov. 10, 2010 (TW) ................................. 99138622 A

(51) Int. Cl.
*G06F 7/04* (2006.01)
*G06F 21/10* (2013.01)

(52) U.S. Cl.
CPC ...................................... *G06F 21/10* (2013.01)
USPC ............... 726/28; 713/190; 713/189; 705/40; 726/22

(58) Field of Classification Search
None
See application file for complete search history.

(56) References Cited

U.S. PATENT DOCUMENTS

| | | | |
|---|---|---|---|
| 6,343,280 B2 | 1/2002 | Clark | |
| 6,983,371 B1 * | 1/2006 | Hurtado et al. | 713/189 |
| 7,243,366 B2 | 7/2007 | Medvinsky et al. | |
| 7,415,618 B2 | 8/2008 | De Jong | |
| 7,430,670 B1 * | 9/2008 | Horning et al. | 713/190 |
| 7,559,091 B2 | 7/2009 | Chu et al. | |
| 7,698,744 B2 | 4/2010 | Fanton et al. | |
| 7,703,142 B1 | 4/2010 | Wilson et al. | |
| 7,711,952 B2 | 5/2010 | Teal et al. | |
| 7,716,474 B2 | 5/2010 | Eriksson et al. | |
| 7,734,687 B2 | 6/2010 | Sargent | |
| 8,151,349 B1 * | 4/2012 | Yee et al. | 726/22 |
| 2004/0083392 A1 | 4/2004 | Yang et al. | |
| 2004/0181489 A1 * | 9/2004 | Oshima et al. | 705/56 |
| 2006/0048223 A1 | 3/2006 | Lee et al. | |
| 2009/0094601 A1 | 4/2009 | Vstovskiy et al. | |
| 2009/0100264 A1 * | 4/2009 | Futa et al. | 713/170 |

(Continued)

FOREIGN PATENT DOCUMENTS

TW    I303764 B    12/2008

OTHER PUBLICATIONS

W.Erik Anderson, On the Secure Obfuscation of Deterministic Finite Automata, *Sandia Report*, 2008, pp. 1-50.

(Continued)

*Primary Examiner* — Andrew Nalven
*Assistant Examiner* — Mohammed Waliullah
(74) *Attorney, Agent, or Firm* — Muncy, Geissler, Olds & Lowe, P.C.

(57) ABSTRACT

A software authorization system has a server end and a user end. A software authorization method includes acquiring a software identification code of a protected software when the user end downloads the protected software from the server end; transmitting the software identification code and an inherent user identification code to the server end; acquiring a first key and main key by the server end according to the user identification code and the software identification code, respectively, so as to generate a second key by operating the main key and the first key and transmit the second key to the user end; restoring the main key by the user end with the second key combined with the first key; and decrypting the protected software by the main key. Therefore, the protected software is hard to be decrypted.

17 Claims, 3 Drawing Sheets

(56) References Cited

U.S. PATENT DOCUMENTS

| | | | |
|---|---|---|---|
| 2010/0070381 A1* | 3/2010 | Shea et al. | 705/26 |
| 2010/0122349 A1 | 5/2010 | LeVine et al. | |
| 2010/0169221 A1 | 7/2010 | Ahn et al. | |
| 2011/0004771 A1* | 1/2011 | Matsushima et al. | 713/189 |

OTHER PUBLICATIONS

Chenxi Wang et al., Protection of Software-based Survivability Mechanisms, *Proc. of International Conference of Dependable Systems and Networks (DSN2001)*, 2001, pp. 193-202.

Stanley Chow et al., An approach to the obfuscation of control-flow of sequential computer programs, *Proc. of 4th Information Security Conference (ISC2001)*, 2001, pp. 144-155.

Christian Collberg et al., A Taxonomy of Obfuscating Transformations, *Computer Science, University of Auckland*, Tech.Report #148, 1997, pp. 1-36.

Fritz Hohl, Time Limited Blackbox Security: Protecting Mobile Agents from Malicious Hosts, *Lecture Notes in Computer Science 1419*, 1998, pp. 92-113.

Kazuhide Fukushima et al., Obfuscation Mechanism in Conjunction with Tamper-Proof Module, *IEEE Computer Science*, 2009, pp. 665-670.

Li Meihong et al., USB Key-Based Approach for Softwar Protection, *IEEE-ICIMA*, 2009, pp. 151-153.

Antonio Mana et al., An Efficient Software Protection Scheme, *Proc. of 16th, IFIP International Conference on Information Security (ISC2001)*, 2001, pp. 385-401.

A.V. Shokurov, An approach to quantitative analysis of resistance of equivalent transformations of algebraic circuits, *Institute for System Programming Russian Academy of Sciences Tech. Report*, 2004, pp. 157-178.

* cited by examiner

SOFTWARE AUTHORIZATION SYSTEM AND METHOD

BACKGROUND OF THE DISCLOSURE

1. Field of the Disclosure

This disclosure relates to software authorization systems and methods, and, more particularly, to a software authorization system and method without transmitting a main key of an encryption software.

2. Description of Related Art

The development of a Content Delivery Network (CDN) technique may increase the response speed of a website. However, followed by the fashion of a cloud operation, the CDN technique which may increase the transmission speed of the website is a constraint in terms of the application of software authorization.

Basically, CDN copies a software (contents) to a plurality of global servers in advance. Therefore, a website manager could not perform an individual process with respect to the software downloaded each time such that many protection mechanism have to be performed at an user end. For example, the practice of downloading the website for Microsoft is to put all certification inspection on a period of installation and execute an activation action during an execution. App Store generates a user key when a user downloads the software and transmits a main key to the user after encrypting the so called main key by Key Encrypt Key (KEK) method, thereby the user may decrypt the software by the main key after downloading the software.

However, since the previously described small programs are easily attacked by a reverse engineering, particularly such as Java byte code, the practice of downloading the website for Microsoft is not suit for the small program sold in a software market while the practice of App Store is proved that an offender may acquire the user key and delivers the program many times after downloading the program. On the other hand, the prior art also provides software authorization and protection device and method thereof generating and encrypting a register code (a random number-MAC address, a hard disk serial number or a software name) at a first time use, registering the register code to an authorization system and writing the register code in a database while a license status has to be checked online during each execution. Moreover, it is a prior art of acquiring the MAC address or the hard disk serial number, and the same parameter may be copied merely by a simple protocol analysis. Next, another method and device for assisting to change a content key may introduce a CEK (Content Encryption Key) from the main key and a content rule. Thus, encryption and decryption may be performed by the same key, and the user may still copy files or contents many times. Additionally, a basic assumption of a relevant paper is that the program is divided into a protected program and a security parameter, wherein the security parameter may be repeatedly used by various kinds of devices, thereby the user may still deliver the program after cracking the program. Security parameters having difference is made if considering security, the CDN technique could not be used since the protected program and the security parameter should be used as a pair.

Hence, under the condition of the life cycle of the software sold in the software market being generally short, it is an imperative issue for a software developer how to provide a software authorization system and method so as to prevent people from downloading the software legally but spreading the software illegally.

SUMMARY OF THE DISCLOSURE

The present disclosure provides a software authorization system and method capable of increasing the difficulty of downloading and decrypting a software so as to suppress who downloads the software illegally or who downloads the software legally while spreading the software illegally.

The software authorization system comprises: a software provision module for providing a protected software encrypted by a main key, wherein the protected software has a software identification code; a processing module for downloading the protected software from the software provision module and outputting the software identification code of the downloaded protected software; an intermediation module having an user identification code and a first key corresponding to the user identification code, wherein the intermediation module is used to receive the software identification code outputted by the processing module; and an authorization module having a main key library and a first key library, wherein the authorization module receives the user identification code and the software identification code outputted by the intermediation module and searches the main key library and the first key library respectively for the main key corresponding to the software identification code and the first key corresponding to the user identification code according to the user identification code and the software identification code, and the authorization module generates a second key by operating the main key and the first key and transmits the second key to the intermediation module so as to restore the main key by the intermediation module according to the inherent first key in combination with the received second key such that the processing module decrypts the downloaded protected software by using the main key.

In an embodiment, the software authorization system of the present disclosure further comprises a conversion module for converting a software to the protected software by an encryption method of the main key and transmitting the protected software to the software provision module. The conversion module is used to divide the software into a plurality of blocks and convert the software to the protected software by encrypting the blocks respectively by the main key so as to obfuscate the data structure and control procedure of the software. The processing module decrypts the blocks respectively by using the main key restored by the intermediation module.

The present disclosure further provides a software authorization method applicable to an software authorization system comprising a server end and an user end, wherein the user end has an user identification code and a first key corresponding to the user identification code, and the server end has a software provision module for providing a protected software encrypted by a main key and an authorization module having the main key and the first key stored therein, the software authorization method comprising the steps of: (1) rendering the user end to acquire a software identification code of the protected software and transmit the inherent user identification code and the software identification code of the protected software to the authorization module when the user end downloads the protected software from the software provision module; (2) rendering the authorization module to acquire the corresponding first key according to the user identification code and the corresponding main key according to the software identification code so as to generate a second key by operating the main key and the first key and transmit the second key to the user end; (3) rendering the user end to restore the main key according to the inherent first key in combination with the received second key; and (4) rendering the user end to decrypt the downloaded protected software by using the restored main key.

The present disclosure could improve the weakness of an original software market and increase the cracking difficulty for an offender. The second key acquired from the authorization module is different since each intermediation module (or user end) has different first key so as to further suppress who downloads the software legally while spreading the software illegally.

DETAILED DESCRIPTION OF PREFERRED EMBODIMENTS

The following specific embodiments are provided to illustrate the disclosure of the present disclosure, these and other advantages and effects can be apparently understood by one skilled in the art after reading the disclosure of this specification. The present disclosure can also be performed or applied by other different embodiments.

Figure 1:
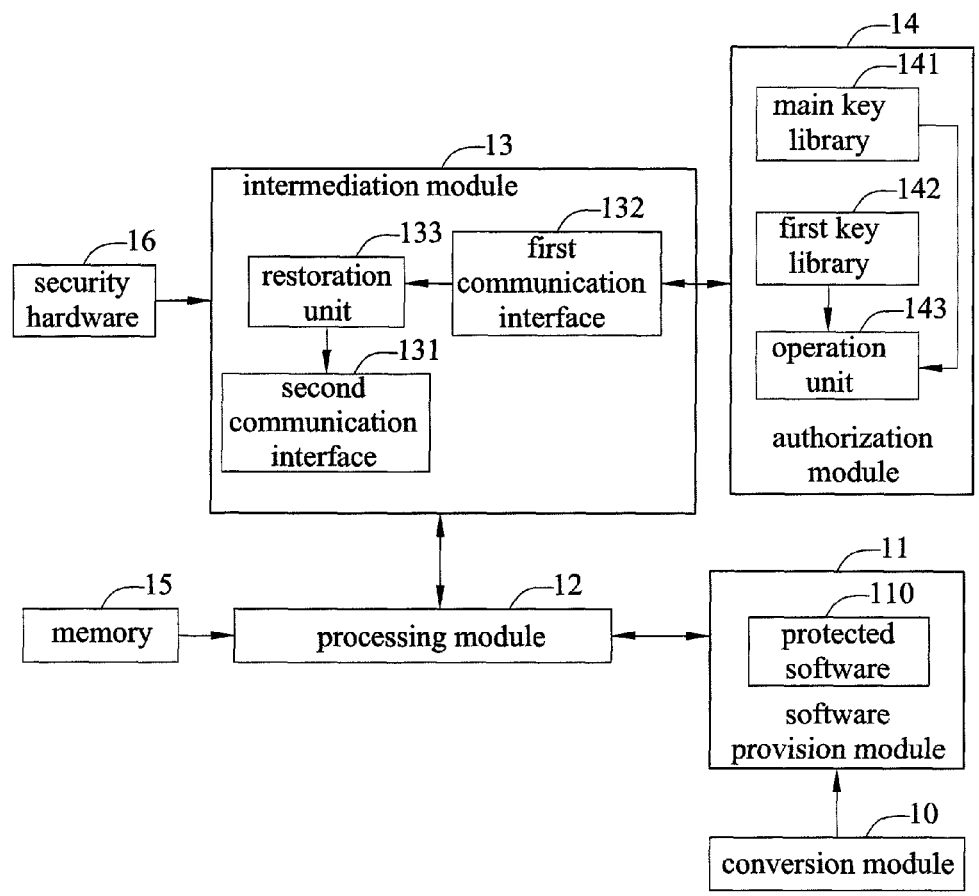
FIG. 1 illustrates a schematic application architecture diagram of a software authorization system in accordance with the present disclosure.

Please referring to FIG. 1, a software authorization system of the present disclosure comprises a software provision module 11, a processing module 12, an intermediation module 13, and an authorization module 14.

The software provision module 11 is used to provide a protected software 110 that is encrypted by a main key, wherein the protected software 110 has a software identification code. Specifically, the software provision module 11 may provide a plurality of species of protected software 110 (that is, various kinds of application programs). This protected software 110 has respective software identification codes. In an embodiment, the software authorization system of the present disclosure further comprises a conversion module 10. The conversion module 10 converts a software to the protected software 110 by a method of encryption, obfuscation or division, and transmits the protected software 110 to the software provision module 11. The conversion module 10 may divide the software into a plurality of blocks and respectively encrypt the blocks by main keys corresponding to the software identification codes when performing encryption, thereby obfuscating the data structure and control procedure of the software so as to render the software to become the protected software 110.

The processing module 12 is used to download the protected software 110 from the software provision module 11 and transmit the software identification code of the downloaded protected software 110 to the intermediation module 13.

The intermediation module 13 has a user identification code and a first key corresponding to the user identification code. The intermediation module 13 receives the software identification code transmitted by the processing module 12 and transmits the user identification code and the software identification code of the downloaded protected software 110 to the authorization module 14. Additionally, the first key may be located in the intermediation module 13 by an obfuscation technique so as to render a user hard to access the first key. Furthermore, the conversion module 10 may add an integrity inspection parameter into the software so as to render the software to become the protected software 110 which is then transmitted to the software provision module 11 such that the intermediation module 13 confirms whether the protected software 110 is tampered or not.

The authorization module 14 has a main key library 141 and a first key library 142. The main key library 141 stores the main key corresponding to the software identification code of the protected software 110. The first key library 142 stores the first key corresponding to the user identification code (the user identification code may be, but not limited to, a random number-MAC address, a hard disk serial number, a software name, a combination thereof or whatever represents an user end) of the intermediation module 13. The authorization module 14 receives the user identification code and the software identification code transmitted by the intermediation module 13, searches the first key library 142 for the corresponding first key according to the user identification code and searches the main key library 141 for the corresponding main key according to the software identification code. Additionally, the authorization module 14 operates the searched main key and first key through an operation unit 143 so as to generate a second key, and transmits the second key to the intermediation module 13 so as to restore the main key by the intermediation module 13 according to a combination of the inherent first key and the received second key (that is, the main key searched by the authorization module 14 or the main key used to encrypt the software such that the software becomes the protected software 110) such that the processing module 12 further decrypts the downloaded protected software 110 by using the main key.

In the embodiment of that the protected software 110 provided by the software provision module 11 is divided into the plurality of blocks, the processing module 12 decrypts the plurality of blocks of the protected software 110 respectively by the main keys restored by the intermediation module 13.

Next, the intermediation module 13 and the processing module 12 may be both located in a common user device, such as a mobile phone or a notebook, or may be respectively located in different electronic devices. In the embodiment of the intermediation module 13 located in the user device, the first key possessed by the intermediation module 13 and the second key received by the authorization module 14 may be stored in a security hardware 16 of the user device, such as an IC card, a SIM card, a TPM (Trust Platform Module) and the like. In the embodiment of the processing module 12 located in the user device, the processing module 12 may store the decrypted software in a memory 15 of the user device.

Particularly, as illustrated in FIG. 1, the intermediation module 13 has a second communication interface 131, a first communication interface 132 and a restoration unit 133. The first communication interface 132 is used to communicate with the authorization module 14 so as to transmit the user identification code and the software identification code of the downloaded protected software 110 and receive the second key. The second communication interface 131 is used to communicate with the processing module 12 so as to provide the processing module 12 with the main key restored by the restoration unit 133.

Furthermore, the operation unit 143 of the authorization module 14 may perform an exclusion operation to the main key (KEY) and the first key (K1) so as to generate the second key (K2), that is, K2=KEY⊕K1. However, the operation method performed by the operation unit 143 is not limited to this exclusion operation. For example, a secret sharing scheme may be used.

It is understood from the embodiment illustrated in FIG. 1 that the intermediation module of the present disclosure has the user identification code and the first key corresponding to the user identification code and receives the second key from the authorization module. The intermediation module restores the main key by using the first key and the second key when the protected software needs decryption execution and authorization inspection. The user must demand another second key from the authorization module when the user would like to install the software in a user device having another intermediation module since different intermediation modules have different second keys from the authorization module. Additionally, it is not easy to decrypt the protected software at one time after the software is obfuscated (divided into the plurality of blocks) and encrypted so as to be converted to the protected software. If the protected software is forcibly decrypted without the second key, the protected software has to be analyzed, and each block has to be recombined. Hence, the software authorization system of the present disclosure may increase the difficulty of downloading the protected software and suppress who downloads the software illegally or who downloads the software legally while spreading the software illegally.

Figure 2:
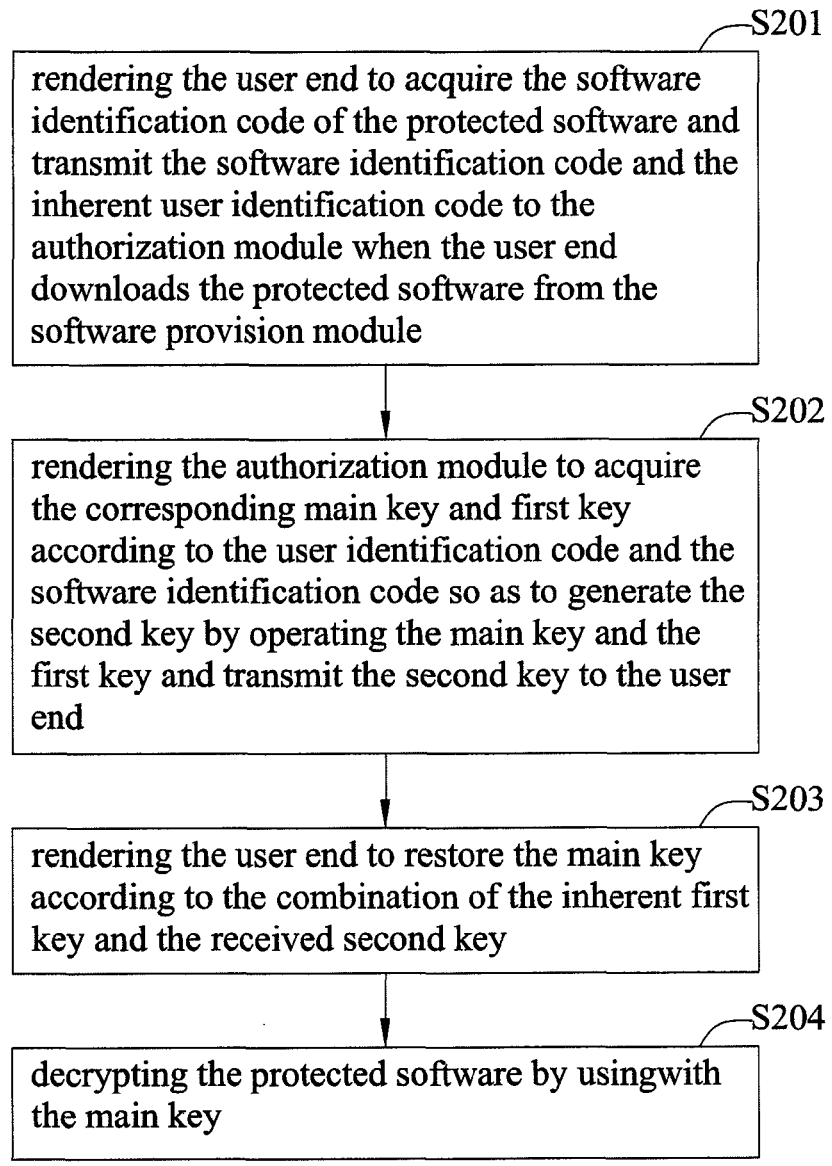
FIG. 2 illustrates a schematic application flow chart of a software authorization method in accordance with the present disclosure.

Next, please refer to FIG. 2, which illustrates a flow chart of a software authorization method of the present disclosure. The software authorization method of the present disclosure is applicable to the software authorization system. The software authorization system primarily comprises a server end and the user end. The user end has the user identification code and the first key corresponding to the user identification code. The server end has the software provision module providing the protected software encrypted by the main key and the authorization module providing the main key and the first key stored therein.

In step S201, the user end is rendered to acquire a software authorization code of the protected software and transmit the inherent user identification code and the acquired software identification code to the authorization module when the user end downloads the protected software from the software provision module. Next, in step S202, the authorization module is rendered to acquire the corresponding main key and first key respectively according to the user identification code and the software identification code so as to generate the second key by operating the main key and the first key and transmit the second key to the user end. Then, step S203 is proceeded.

In step S203, the user end receives the second key and is rendered to restore the main key according to the combination of the inherent first key and the received second key. In step S204, the downloaded protected software is decrypted by using the restored main key.

Figure 3A:
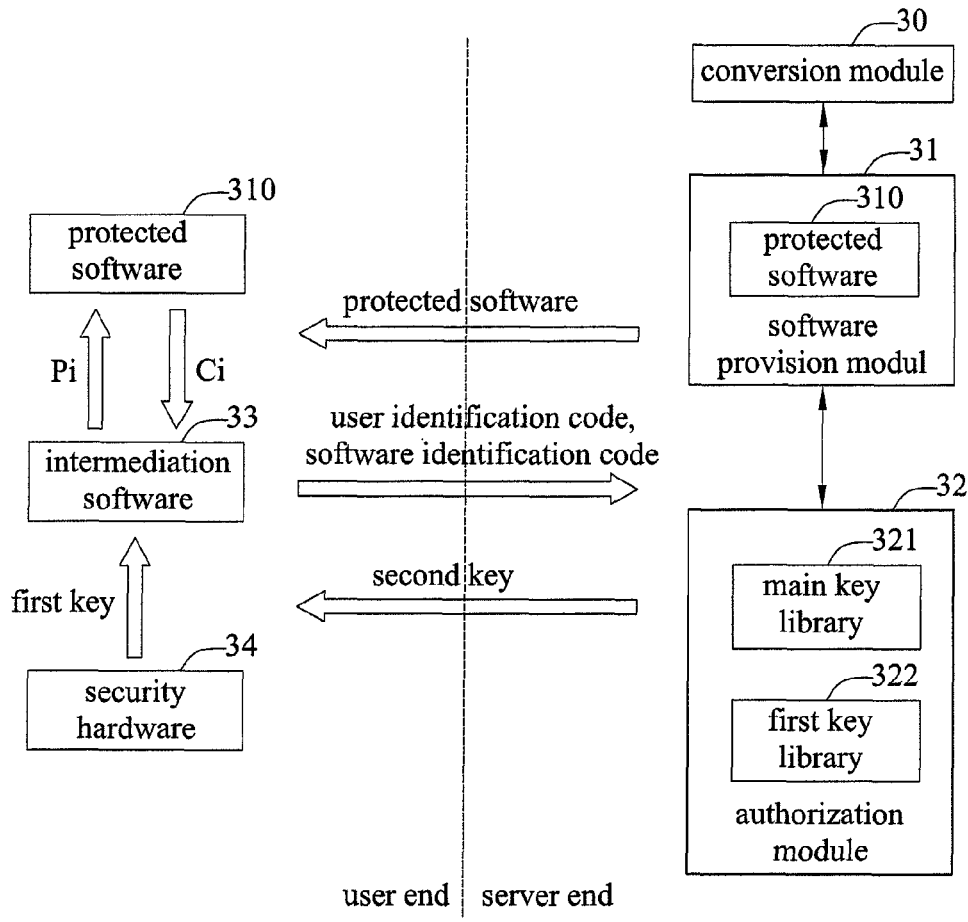
FIG. 3A illustrates a schematic embodiment architecture diagram of the software authorization method in accordance with the present disclosure.
Figure 3B:
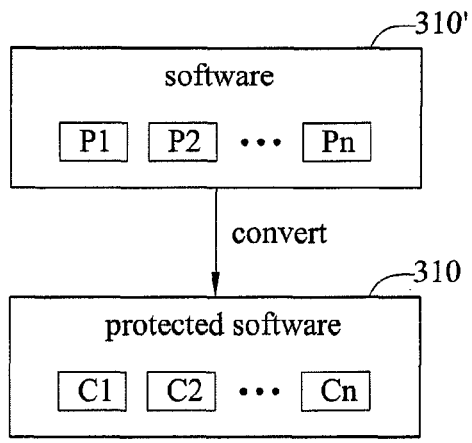
FIG. 3B illustrates a schematic illustration diagram of the software authorization method of converting a software to a protected software in accordance with the present disclosure.

Please referring to FIG. 3A and FIG. 3B, when been implemented, the server end has the conversion module 30, the software provision module 31 and the authorization module 32, and the user end has the intermediation software 33 and the security hardware 34. It should be noted that in an actual application of the present disclosure, the user end may be exemplarily an intelligent mobile phone, and the server end may provide the intelligent mobile phone with download of various kinds of application programs.

The server end converts the software 310' to the protected software 310 through the conversion module 30. As illustrated in FIG. 3B, the blocks P1, P2, ..., and Pn are encrypted respectively by the main keys and rendered to become the blocks C1, C2, ..., and Cn after the software 310' is divided into the plurality of blocks P1, P2, ..., and Pn, such that the software 310' is converted to the protected software 310. Next, the server end issues the protected software 310 to a network node closest to the user (that is, the software provision module 31 illustrated in FIG. 3A) such that the user end may obtain required contents nearby, thereby solving the status of network congestion and increasing the response speed of the user accessing a software provision website. On the other hand, when the conversion module 30 encrypts the software 310' by using different main keys, the main keys will be stored in that main key library 321 of the authorization module 32, and a plurality of first keys corresponding to the user identification codes are stored in the first key library 322. In other words, the server end has stored the correspondence of the user identification code and the first key in the authorization module 32 in advance.

The user end may acquire the software identification code of the protected software 310 and upload the software identification code and the inherent user identification code to the server end when the user end downloads the protected software 310 from the server end. The authorization module 32 of the server end acquires the main key and the first key respectively according to the software identification code and the user identification code so as to generate the second key by operating the first key and the main key and transmit the second key to the user end. In other words, the user end may connect the authorization module 32 by the software provision module 31 so as to acquire the second key when the user end connects the server end so as to download the protected software.

In the server end, the security hardware 34 has the first key stored therein. The security hardware 34 transmits the first key to the intermediation software 33 such that the intermediation software 33 restores the main key according to the first key and the second key. The intermediation software 33 and the protected software 310 establish a connection so as to decrypt the plurality of blocks C1, C2, ..., and Cn of the protected software 310 by using the main key and further complete the decryption of the protected software 310.

In conclusion, the software authorization system of the present disclosure may be divided into the server end and the user end. The server end may comprise the software provision module and the authorization module. The user end primarily comprises the intermediation module (or the intermediation software) and the processing module. The server end may put the protected software on a server of a CDN in advance so as to decrease the response speed of download. Each of the user ends has different first key. The server end may download the protected software by using the processing module. The intermediation module outputs the software identification code and the user identification code corresponding to the first key to the authorization module such that the authorization module searches the corresponding main key and first key so as to generate the second key. The user end restores the main key according to the combination of the inherent first key and the receive second key so as to establish the connection with the downloaded protected software and commonly decrypt the blocks of the protected software.

Therefore, regarding to the application of the software authorization system and the method thereof of the present disclosure, an offender has to download the protected software, block by block, many times, analyze a communication protocol of the intermediation module and the authorization module so as to acquire the second key, analyze the intermediation module so as to acquire the first key thereof, and finally analyze a decryption process of the downloaded protected software so as to completely decrypt the protected software. Hence, the offender has difficulty to develop an auto tool for a general user, thereby preventing who downloads the software illegally or who downloads the software legally while spreading the software illegally so as to increase the life of the software while matching characteristics of short life cycle of the software sold in the software market.

The foregoing embodiments are only exemplarily illustrated to disclose the principles, features and effects of the present disclosure and not restrictive of the scope of the present disclosure. Persons skilled in the art all could modify and vary the foregoing embodiments without departing from the spirit and scope of the present disclosure. Equivalent variations and modifications completed by applying the disclosure of the present disclosure should be covered by the appended claims. Hence, the scope of the present disclosure should be claimed as the appended claims.

What is claimed is:

1. A software authorization system, comprising:
    a software provision module for providing a protected software encrypted by a main key, wherein the protected software has a software identification code;
    a processing module for downloading the protected software from the software provision module and outputting the software identification code of the downloaded protected software;
    an intermediation module having an user identification code and a first key corresponding to the user identification code, wherein the intermediation module is used to receive the software identification code outputted by the processing module;
    an authorization module having a main key library and a first key library, wherein the authorization module receives the user identification code and the software identification code outputted by the intermediation module, searches the main key library and the first key library respectively for the main key corresponding to the software identification code and the first key corresponding to the user identification code according to the user identification code and the software identification code, generates a second key by operating the main key and the first key with a secret sharing scheme, and transmits the second key to the intermediation module so as to restore the main key by the intermediation module according to the inherent first key in combination with the received second key such that the processing module decrypts the downloaded protected software by using the main key; and
    a conversion module for converting a software to the protected software by an encryption method of the main key and transmitting the protected software to the software provision module, wherein the conversion module adds an integrity inspection parameter into the software so as to render the software to become the protected software.

2. The system of claim 1, wherein the conversion module is used to divide the software into a plurality of blocks and convert the software to the protected software by encrypting the blocks respectively by the main key so as to obfuscate a data structure and control procedure of the software.

3. The system of claim 2, wherein the processing module decrypts the blocks respectively by using the main key restored by the intermediation module.

4. The system of claim 1, wherein the intermediation module comprises:
    a first communication interface for transmitting the user identification code and the software identification code to the authorization module and receiving the second key from the authorization module;
    a restoration unit for combining the first key and the received second key so as to restore the main key; and
    a second communication interface for receiving the software identification code of the protected software downloaded by the processing module and transmitting the main key to the processing module.

5. The system of claim 1, wherein the secret sharing scheme is an exclusion operation.

6. The system of claim 1, wherein the first key is located in the intermediation module by an obfuscation technique.

7. The system of claim 1, wherein the intermediation module is located in a user device, and the first key owned by the intermediation module and the second key received by the intermediation module are stored in a security hardware of the user device.

8. The system of claim 1, wherein the processing module is located in a user device and stores the decrypted protected software in a memory of the user device.

9. The system of claim 1, wherein the protected software is issued to a network node closest to a user end that has the intermediation module.

10. The system of claim 9, wherein the software provision module is connected to the authorization module such that the user end obtains the second key from the authorization module.

11. A software authorization method applicable to a software authorization system, wherein the software authorization system has a server end and an user end, the user end has a user identification code and a first key corresponding to the user identification code, and the server end has a software provision module for providing a protected software encrypted by a main key and an authorization module having the main key and the first key stored therein, the software authorization method comprising the steps of:
    (1) rendering the user end to acquire a software identification code of the protected software and transmit the inherent user identification code and the software identification code of the protected software to the authorization module when the user end downloads the protected software from the software provision module;
    (2) rendering the authorization module to acquire the corresponding first key according to the user identification code and the corresponding main key according to the software identification code so as to generate a second key by operating the main key and the first key with a secret sharing scheme and transmit the second key to the user end;
    (3) rendering the user end to restore the main key according to the inherent first key in combination with the received second key; and
    (4) rendering the user end to decrypt the downloaded protected software by using the restored main key,
    wherein step (1) further comprises rendering the server end to convert a software to the protected software by an encryption method of the main key so as to provide the user end with download of the protected software, wherein the conversion module adds an integrity inspection parameter into the software so as to render the software to become the protected software.

12. The method of claim 11, wherein step (1) further comprises rendering the server end to divide the software into a plurality of blocks and convert the software to the protected software by encrypting the blocks respectively by the main key, and step (4) further comprises rendering the user end to decrypt the plurality of blocks respectively by the restored main key.

13. The method of claim 11, wherein the user end further comprises an intermediation software for establishing a connection with the downloaded protected software, and a decryption method of step (4) is to render the intermediation software to establish the connection with the downloaded protected software by an inter process communication (IPC) technique so as to decrypt the protected software by using the main key.

14. The method of claim 11, wherein the user end further comprises an intermediation software, and the first key is located in the intermediation software by an obfuscation technique.

15. The method of claim 11, wherein the user end further comprises a security hardware, and the first key and the received second key are stored in the security hardware.

16. The method of claim 11, wherein the protected software is issued to a network node closest to the user end.

17. The method of claim 16, wherein the software provision module is connected to the authorization module such that the user end obtains the second key from the authorization module.

* * * * *